US008626788B2

(12) United States Patent
O'Donnell (10) Patent No.: US 8,626,788 B2
(45) Date of Patent: Jan. 7, 2014

(54) METHOD FOR DETERMINING RELATIVE RANKING DATA IN A BROKER MEDIATED GEOSPATIAL INFORMATION SERVICE ENVIRONMENT

(75) Inventor: Darrell O'Donnell, Ottawa (CA)

(73) Assignee: Continuum Loop Inc., Ottawa, Ontario (CA)

(*) Notice: Subject to any disclaimer, the term of this patent is extended or adjusted under 35 U.S.C. 154(b) by 1234 days.

(21) Appl. No.: 12/155,578

(22) Filed: Jun. 6, 2008

(65) Prior Publication Data

US 2008/0313020 A1 Dec. 18, 2008

Related U.S. Application Data

(60) Provisional application No. 60/929,114, filed on Jun. 13, 2007.

(51) Int. Cl.
*G06F 7/00* (2006.01)
*G06F 17/30* (2006.01)
*G06F 15/16* (2006.01)

(52) U.S. Cl.
USPC ............................. 707/770; 707/749; 709/203

(58) Field of Classification Search
None
See application file for complete search history.

(56) References Cited

U.S. PATENT DOCUMENTS

| 7,542,882 B2* | 6/2009 | Agrawala et al. ................. 703/2 |
| 2005/0165738 A1* | 7/2005 | Lancefield ........................ 707/3 |
| 2007/0282732 A1* | 12/2007 | Schulman et al. .............. 705/37 |

* cited by examiner

*Primary Examiner* — Cheryl Lewis
*Assistant Examiner* — Raheem Hoffler
(74) *Attorney, Agent, or Firm* — Freedman & Associates (57) ABSTRACT

A method for determining a value indicator in a broker-mediated geospatial information service environment includes receiving feedback data at a first system of the broker-mediated geospatial information service environment. In particular, the feedback data is received from a plurality of respondents, and relates to a broker-mediated geospatial information service provided to each respondent of the plurality of respondents. Furthermore, each respondent of the plurality of respondents is a prior requestor of a process-dataset solution for performing the broker-mediated geospatial information service. Based on the feedback data, a value indicator relating to the process-dataset solution is determined.

27 Claims, 5 Drawing Sheets

METHOD FOR DETERMINING RELATIVE RANKING DATA IN A BROKER MEDIATED GEOSPATIAL INFORMATION SERVICE ENVIRONMENT

This application claims the benefit of U.S. Provisional Application No. 60/929,114 filed on Jun. 13, 2007, the entire content of which is incorporated herein by reference.

FIELD OF THE INVENTION

The instant invention relates generally to searching, and more particularly to searching and retrieval of information having a geospatial component.

BACKGROUND

Geospatial is a term that is used widely to describe the combination of spatial software and analytical methods with terrestrial or geographic datasets. Geospatial data identifies the geographic location and characteristics of natural or constructed features and boundaries on the earth. This information is gathered from remote sensing, mapping, surveying and other technologies. Geospatial systems capture, store, manage, integrate, display, analyze and otherwise assist in the interpretation of this data in its entire context for better decision-making. A geographic location optionally is represented as a point, line, area or volume, and optionally is represented in either two-dimensions or three-dimensions.

Unfortunately, experts in data collection are typically separate and distinct from experts in data processing. In data collection, maps and other spatial information are combined to form a larger spatial dataset. For example, addresses are superimposed on a map or two maps are coupled to form a larger map. This data is then stored in a structure that is suitable for processing thereof. Once a dataset is formed, it becomes available for analysis. Experts in geographic data analysis develop processes that are designed to operate with the data structure to extract from the dataset "useful" information. For each problem that is encountered, an expert is consulted to design a process that allows the problem to be better analysed, avoided, or solved. Since the process is designed for a given dataset and for solving a given solution, the process designer can ensure that the process functions within specifications and, once designed, the process can be executed on the dataset in a repeatable fashion.

As is true of information in general, the volume of available geographic data is expanding continuously, thereby providing process developers with new opportunities to develop improved processes that enable decision makers to make better and more informed decisions. That said, most process developers are well versed in specific datasets thereby limiting the available datasets for their processes. Furthermore, many organizations already have access to specific datasets, and as such, tend only to work with process developers that are already versed in processing those datasets. Despite this tendency, some processes are executable on datasets other than the ones for which the process was developed initially. In some cases, the same process may yield different geospatial information depending on the dataset that is being analyzed. That is to say, the geospatial information may be biased in some way as a result of the way each dataset was created, such as for instance either during collection of the geographic data itself or in the way the structure of the dataset was defined. Similarly, different processes executed on the same dataset may yield different geospatial information depending upon the particular bias that is built into each different process.

Currently, there is not a reliable method for evaluating a ranking of geospatial processes and datasets. In effect, a process developer is selected and employed for processing a particular dataset or for processing a convenient dataset. In either case, a "best" result may not ensue.

It would be beneficial to provide a method and system that solves at least some of the above-mentioned problems.

SUMMARY OF EMBODIMENTS OF THE INVENTION

According to an aspect of the instant invention there is provided a method for determining a value indicator in a broker-mediated geospatial information service environment, comprising: receiving at a first system of the broker-mediated geospatial information service environment, from a plurality of respondents, feedback data relating to a broker-mediated geospatial information service provided to each respondent of the plurality of respondents, each respondent of the plurality of respondents being a prior requestor of a process-dataset solution for performing the broker-mediated geospatial information service; and, based on the feedback data, determining a value indicator relating to the process-dataset solution.

According to another aspect of the instant invention there is provided a method for determining a value indicator in a broker-mediated geospatial information service environment, comprising: for each of a plurality of process-dataset solutions, evaluating usage data for determining instances of repeat usage of a same process-dataset solution by a same requester of a plurality of requesters; ordering the process-dataset solutions of the plurality of process-dataset solutions according to one of a frequency of instances of repeat usage and a relative frequency of instances of repeat usage; and, determining a value indicator for a particular process-dataset solution of the plurality of process-dataset solutions based on the ordered position of the particular process-dataset solution.

According to another aspect of the instant invention there is provided a method for determining a value indicator in a broker-mediated geospatial information service environment, comprising: evaluating usage data relating to a plurality of process-dataset solutions, to determine a frequency of repeat usage for each of the plurality of process-dataset solutions; and, determining a value indicator for a particular process-dataset solution of the plurality of process-dataset solutions based on the determined frequency of repeat usage for the particular process-dataset solution relative to the determined frequencies of repeat usage for other process dataset solutions of the plurality of process dataset solutions.

According to another aspect of the instant invention there is provided a method for determining a value indicator in a broker-mediated geospatial information service environment, comprising: evaluating usage data relating to a plurality of process-dataset solutions, to determine a frequency of repeat usage for each of the plurality of process-dataset solutions; and, determining a value indicator for a particular process-dataset solution of the plurality of process-dataset solutions based on the determined frequency of repeat usage for the particular process-dataset solution relative to the determined frequency of unique usage for the particular process dataset solution.

According to another aspect of the instant invention there is provided a method for determining a value indicator in a broker-mediated geospatial information service environment, comprising: retrievably storing feedback data from a plurality of respondents, the feedback data relating to a broker-mediated geospatial information service provided previously to each respondent of the plurality of respondents, the feedback data being stored in a manner such that the feedback data provided by a specific respondent is associated uniquely therewith, each respondent of the plurality of respondents being a prior requestor of a particular process-dataset solution for performing the broker-mediated geospatial information service; receiving an indication of a first request from a current requester, the indication having the particular process-dataset solution; and, based on stored feedback data that is uniquely associated with at least some of the respondents of the plurality of respondents, determining a value indicator relating to the particular process-dataset solution.

According to another aspect of the instant invention there is provided a method for determining a value indicator in a broker-mediated geospatial information service environment, comprising: receiving at a first system of the broker-mediated geospatial information service environment, from a plurality of respondents, feedback data relating to a broker-mediated geospatial information service provided to each respondent of the plurality of respondents; and, based on the feedback data, determining a value indicator relating to one of a process and a dataset that is associated with the broker-mediated geospatial information service.

BRIEF DESCRIPTION OF THE DRAWINGS

Embodiments of the instant invention are now described with reference to the figures in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Throughout the detailed description and in the appended claims, the following terms are to be accorded the following definitions:

Location—is defined as a position in space, where position may be represented by a point, line, polygon, or volume in 3-dimensional space.

Requestor—is defined as either a human user of the broker mediated geospatial information service, or as a process in execution on a system for providing a service to a human user or to another system. For example, the process in execution comprises an agent having user preferences provided thereto such that the agent searches for and engages geospatial information services on behalf of the human user.

Process—is defined as an implementation of a method for processing, filtering, combining, or searching geographic information within one or more dataset. A process optionally includes several processes operating on one or more dataset in parallel, in series, or in some other way. Though a dataset is typically a stored dataset, it is also optionally a second dataset resulting from application of one or more processes to a first dataset.

Search criteria—is defined as a set of parameters, rules and/or policies that is specified by a requestor in order to define a request for specific geospatial information. By way of several specific and non-limiting examples, the set of parameters optionally includes any of the following: the current location of the requester, the destination of the requester, a complete or partial itinerary of the requester, a planned travel route of the requestor, requestor preferences (i.e. profile data such as: the requestor likes to walk between itinerary points, the requestor likes to sleep/eat within a certain distance of public transit stops, the requester requires an eating establishment that caters to specific dietary requirements, the requestor enjoys live theater, the requester likes to shop at high-end jewelry boutiques, or any other profile data that may be specified in order to refine the searching process). Other parameters and/or rules may be envisaged, depending upon the nature of the request, etc.

Geospatial information service—is defined as the processing of a dataset to obtain a result in accordance with the set of parameters and/or rules as defined in the search criteria. The dataset comprises geospatial information, including location and characteristic data relating to natural and constructed features. The act of performing the geospatial information service includes providing to the requestor the result so obtained. Different geospatial information services are considered to result when the same process is executed on different datasets, or when different processes are executed on the same dataset.

Process-dataset solution—is defined as a specific process and dataset grouping, as determined by a geospatial information service broker, for performing a requested geospatial information service. Depending on the geospatial information service that is requested, plural process-dataset solutions may be available. In the case of a simple geospatial information service, the process-dataset solution includes only a specific process and a specific dataset. When executed on the specific dataset, the specific process returns a result in accordance with the set of parameters as defined in the search criteria. Optionally, the process-dataset solution includes plural processes for being executed on one or plural datasets. Further optionally, results of one processing step are further processed using additional processes or are combined with additional datasets. Further optionally, the process-dataset solution is provided in a step-wise fashion. For instance, the geospatial information service broker provides initially a plurality of available processes only. The requestor selects one process of the plurality of available processes, and is presented subsequently with a list of available datasets.

Value indicator—is defined as information that is provided to the requestor in association with the process-dataset solution. In particular, the value indicator relates to a ranking of the process-dataset solution, or alternatively to a ranking of individual components of the process-dataset solution. The value indicator optionally is either qualitative or quantitative. The value indicator optionally is provided in the form of a numeric scale, an alphabetic scale, a symbol-based scale (e.g. happy face/neutral face/smiley face, thumbs-up/thumbs-down, a star-rating, pie-chart etc.), or in any other form that can convey to the requestor the value of one process-dataset solution relative to another process-dataset solution. Of course, since the requestor may be a process in execution on a system, the value indicator need not even be provided in a human intelligible form. Furthermore, the value indicator may simply be implied based on the ordering of the process-dataset solutions in a list.

Geospatial information service broker—is defined as a system that is disposed between the requestor and a plurality of geospatial information service providers. The geospatial information service broker determines a plurality of process-dataset solutions that relate to the search criteria as provided by the requestor. The geospatial information service broker also maintains a database of value indicators including at least one value indicator that is stored in association with each process-dataset solution, or with the component process and dataset of each process-dataset solution. Additionally, the geospatial information service broker provides to the requestor a list including at least some of the plurality of process-dataset solutions and at least one value indicator associated with each process-dataset solution.

Geospatial information service provider—is defined as a system that provides for the implementation of a selected process-dataset solution and then provides a result of the process-dataset solution to the requester. Often the geospatial information service provider includes a processor for executing the process-dataset solution, but this need not be the case. Optionally, the geospatial information service broker includes a geospatial information service provider.

Dataset provider—provider of a geospatial information dataset.

Process provider—a provider of a process for processing geospatial information datasets.

Advertising Provider—a provider that specifically provides advertising services for display to a consumer.

Aggregation server—a server of a broker-mediated geospatial information service environment for aggregating feedback data.

A broker mediated geospatial information service model is described in a co-pending application Ser. No. 12/155,577 entitled "BROKER MEDIATED GEOSPATIAL INFORMATION SERVICE" in the name of Darrell O'Donnell and filed on or about Jun. 6, 2007, the entire contents of which are herein incorporated by reference. Therein, a requester provides search criteria for a geospatial information service and is provided with a list of process-dataset solutions that are capable of returning geospatial information in accordance with the search criteria. The requestor then selects a process-dataset solution from the list, and finally the specified service is performed based on that selection. Unfortunately, there is no way for the requester to assess which process-dataset solution is best suited for performing the geospatial information service in a way that meets their specific expectations at that time. Accordingly, the requester must either use a trial-and-error approach to determine which process-dataset solution best suits their needs, or simply choose one process-dataset solution and accept the results as provided. Of course the trial-and-error approach is in some cases time consuming and may also result in excessive billing costs to the requestor, whilst the arbitrary selection of only one process-dataset solution may not provide the geospatial information the requester needs in order to make the best decision.

Figure 1:
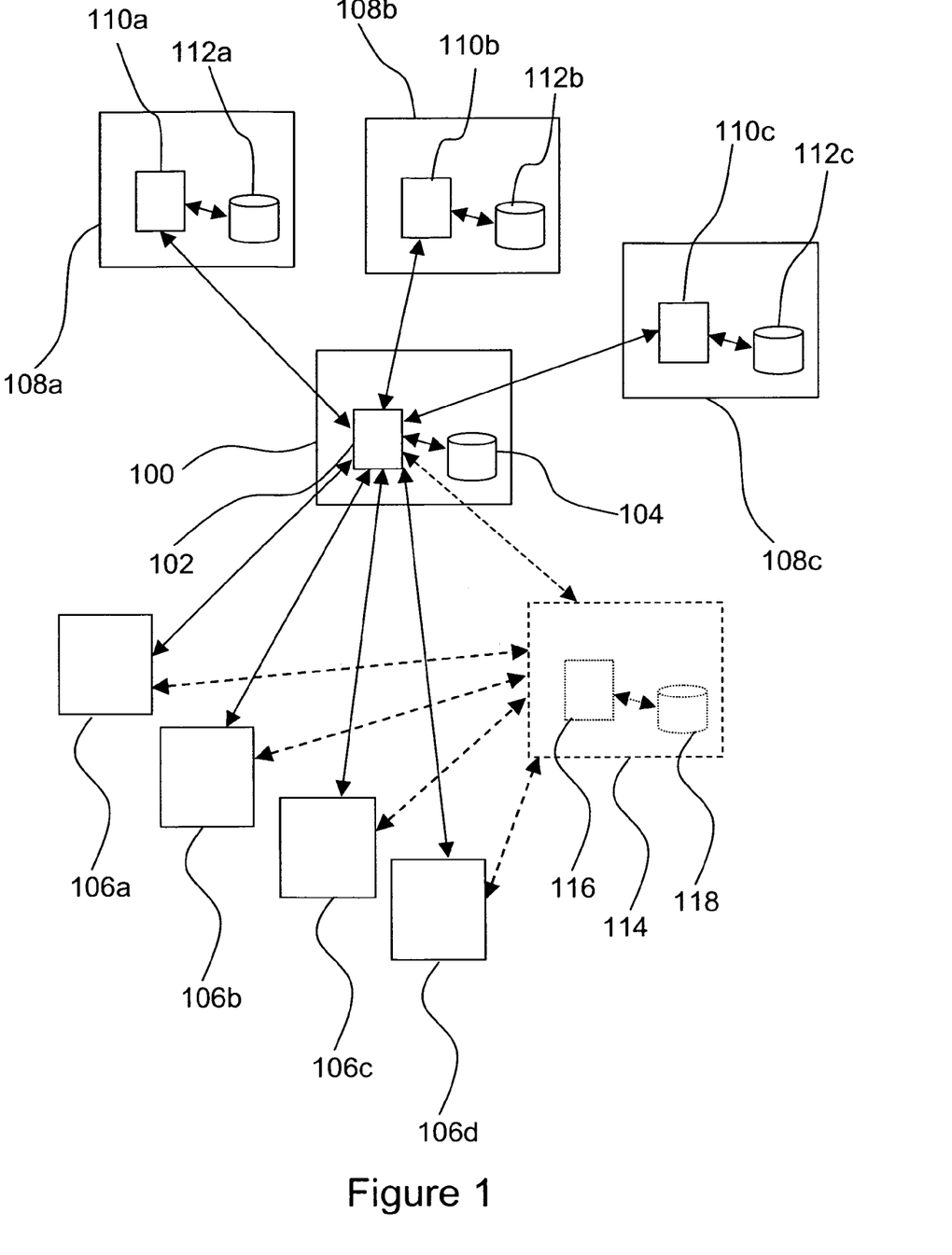
FIG. 1 is a simplified schematic diagram of a broker-mediated geospatial information service environment, which is suitable for implementing methods according to the various embodiment of the instant invention.

Referring now to FIG. 1, shown is a simplified schematic diagram of a broker-mediated geospatial information service environment, which is suitable for implementing methods according to the various embodiments of the instant invention. A broker system 100 includes a processing and communications module 102 that is in communication with a memory storage device 104. The processing and communications module 102 is also in communication with a plurality of requesters 106a through 106d. Each requestor of the plurality of requesters is optionally a human user, a process in execution on a system of the human user for providing a service to the human user or to another system, or a process in execution on another processor. In each case, each requester 106a through 106d includes a not illustrated communications module for communicating with the broker system 100 and a not illustrated user interface for providing data to and for receiving data from a human user. Optionally, the system of FIG. 1 includes plural broker systems, with each broker system being in communication with other broker systems of the plurality. Further optionally, each requester is in communication with more than one broker system of the plurality.

The processing and communications module 102 is further in communication with a plurality of other systems 108a through 108c. Each one of the other systems 108a through 108c is at least one of a dataset provider and a process provider, and includes a processing and communications module 110a through 110c that is in communication with a memory storage device 112a through 112c, respectively. Each memory storage device 112a through 112c has stored thereon at least one of a geospatial information dataset and program code for, when in execution on a processor, processing a geospatial information dataset. Optionally, the program code that is stored in association with a particular one of the other systems is executed on a processing and communications module of the same system, or the program code is provided to a different one of the other systems or to the broker system 100 for execution on a processing and communications module thereof. Further optionally, the various processing and communications modules are provided in the form of an integrated unit or in the form of at least two separate units including a communications unit and a processing unit. Though in the description above, each memory storage device comprises one of a process and a dataset, in practice a same storage device typically comprises many datasets, many processes, or both processes and datasets. Furthermore, if plural broker systems are included in the system then at least some broker systems of the plurality are optionally in communication with more than one of the other systems 108a through 108c.

An aggregation server 114 optionally is provided, including a processing and communications module 116 and a memory storage device 118. The aggregation server 114 is in communication with the broker system 100 and/or with one or more of the requesters 106a through 106d.

Referring still to FIG. 1, any one of the requestors 106a through 106d initiates a broker mediated geospatial information session by providing a request to the communications and processing module 102 of the broker system 100. The request includes search criteria for returning geospatial information to the requester. More particularly, the search criteria includes a set of parameters and/or rules that is specified by a requester in order to define a request for specific geospatial information. By way of a specific and non-limiting example, a simple request requires an indication of a hotel that is within a predetermined travel distance of an itinerary point, as specified by the requester. A dataset containing only basic information relating to the geographic location of features on the earth may be processed using a simple process to return geospatial information in accordance with such a simple request. By way of another specific and non-limiting example, a complex request requires a driving route definition for a three day trip between specified starting and stopping points, limited in that an indication of a hotel is required for each of two, one-night stopovers in different cities, each hotel being within two city blocks of a vegetarian restaurant and within three city blocks of at least one of a live theater and a movie theater, and further limited in that the driving route must provide for a rest stop during every three hours of driving time at a rest station or at a service station having clean bathrooms, and must allow for lunch breaks along the route at a restaurant with a minimum three star rating. In order to return geospatial information in accordance with such a complex request, a detailed dataset is required that includes data relating to the geographic locations of features on the earth, as well as opinion and rating data that has been collected for facilities and/or services along the route. Furthermore, a sophisticated process is required to correlate and filter the dataset. Alternatively, plural datasets and/or plural processes are required in order to return geospatial information in accordance with the complex request. Of note, different processes relying on different data or interpreting data differently will provide for different results that may be qualitatively of differing value, accuracy, and usefulness.

During use, the broker system 100 determines a plurality of process-dataset solutions, each of which defines a geospatial information service that is capable of returning geospatial information to the requestor in accordance with the search criteria of a particular request. The broker system 100 then provides a list comprising the determined plurality of process-dataset solutions, from which list the requester chooses a particular process-dataset solution for obtaining geospatial information in accordance with the provided search criteria. Unfortunately, there currently is no way for the requestor to assess in advance which process-dataset solution of the plurality will provide the geospatial information that is "best" suited for their particular requirement at that particular time. Considering in turn each of the two examples that are presented supra, it will become apparent to one of skill in the art that this is not a trivial problem.

In the case of the simple request, the broker system 100 determines that each one of the other systems 108a through 108c has associated therewith a process and a dataset for inclusion in the list. Furthermore, the process associated with each one of the other systems 108a through 108c may process the dataset associated with any of the other systems. Accordingly, in this example the list that is returned from the broker system 100 to the requestor includes nine (9) distinct process-dataset solutions. Alternatively, in the case of the complex request, the broker system 100 determines a first process-dataset solution in which the process of system 108b processes the dataset of system 108c to create a first processed dataset, and the process of system 108a subsequently processes the first processed dataset to obtain the geospatial information in accordance with the search criteria. The broker system also determines a second process-dataset solution in which the process of the system 108a processes the dataset of the system 108a to create a first processed dataset, in parallel the process of the system 108b processes the dataset of the system 108c to create a second processed dataset, then the first processed dataset is combined with the second processed dataset to create a combined processed dataset, and finally the process of the system 108c processes the combined processed dataset to obtain the geospatial information in accordance with the search criteria. Although the list that is provided to the requestor in this case comprises only two (2) process-dataset solutions, nevertheless the selection of one over the other is not obvious because the relationships between the different processes and datasets is complex.

According to an embodiment of the instant invention, the list that is provided from the broker system 100 to the requestor includes a value indicator associated with each process-dataset solution in the list. Optionally, the value indicator is associated with a process-dataset solution as a whole. Further optionally, the value indicator includes a plurality of different value indicators, each different value indicator being associated with a component or with a group of components of the process-dataset solution. For instance, a first value indicator is associated with the process component of a process-dataset solution and a second value indicator is associated with the dataset component of a process-dataset solution. In general terms, the value indicator simply is indicative of a value of the process-dataset solution, or of the components thereof. In other words the value indicator is a form of a relative ranking system for identifying those process-dataset solutions that, if selected, are likely to return information that is of value to the requestor. The value indicator optionally is provided in the form of a numeric scale, an alphabetic scale, a symbol-based scale (e.g. happy face/neutral face/smiley face, thumbs-up/thumbs-down, a star-rating, pie-chart etc.), or in any other form that can convey to the requestor the value of one process-dataset solution relative to another process-dataset solution. Of course, since the requestor may be a process in execution on a system, the value indicator need not even be provided in a human intelligible form. Furthermore, the value indicator may simply be implied based on the ordering of the process-dataset solutions in a list.

Optionally, the aggregation server 114 determines the value indicator. For instance, the aggregation server 114 includes a processing and communications module 116 that is in communication with a memory storage device 118. In this case, the broker system 100 either provides a process-dataset solution to the aggregation server, which then provides the process-dataset solution and an associated value indicator to a current requester, or the aggregation server 114 provides the value indicator to the broker system 100, which then provides the process-dataset solution and associated value indicator to the current requester.

The value indicator for a particular process-dataset solution is determined, for instance, based on user feedback data that is provided, for instance, by prior users of a geospatial information service that is performed by processing the dataset of the particular process-dataset solution using the process of the particular process-dataset solution. In particular, a requestor that provides feedback data is referred to as a respondent. Optionally, the respondent provides feedback data relating to a process-dataset solution, or the respondent provides feedback data relating to only one of a process and a dataset of a process-dataset solution. Further optionally, the respondent provides feedback data directly to the aggregation server 114, or the respondent provides feedback data to the aggregation server 114 via broker system 100.

As discussed supra, the process and the dataset of a process-dataset solution need not both be associated with a same system. Accordingly, when a prior user receives geospatial information from the broker system 100 resulting from the performance of a selected process-dataset solution, the user provides feedback data that is indicative of the value of the geospatial information. Of course, this type of user feedback data is subjective in nature and is also susceptible to malicious misrepresentation. That being said, the instant invention envisages several different approaches for determining the value indicator so as to reduce the impact of the stated limitations.

In one approach the value indicator is based on feedback data that is collected from an entire population of prior users or respondents. When the population is sufficiently large, the subjective nature of the ranking system tends to be smoothed out, or statistical treatments may be applied to the data in order to correct for this limitations. Optionally, the feedback data is collected at the broker system 100 or at the aggregation server 114. Optionally, the value indicator is either qualitative or quantitative.

In another approach the value indicator is based on feedback data that is provided by less than an entire population of prior users or respondents. For instance, a current requestor defines a group of trusted prior users or respondents, and the value indicator is based on feedback data that is provided from only the trusted prior users or respondents. The requester may optionally edit, expand, narrow or otherwise modify the group of trusted users or respondents over time. For instance, the requester may become aware that one trusted user is consistently providing high value ratings to geospatial information that is actually of low value to the requestor. Alternatively, the requester may wish to add trusted users or respondents to the group of trusted users or respondents, such as for instance when friends or family members begin using the broker mediated geospatial information service.

In yet another approach, the broker system 100 or aggregation server 114 determines a value indicator based on feedback data provided by prior users that are statistically or demographically similar to the requestor. In this case, the broker system 100 or aggregation server 114 must either maintain profile data for the requester, or the requestor must provide profile data to the broker system 100 or aggregation server 114. By way of a specific and non-limiting example, the requestor provides profile data indicating that the requester is a 35 year old male with frequent business travel by air, who enjoys seafood, swimming, live theater, museums with modern art displays, antique bookstores, Irish style pubs, and prefers accommodations that are within walking distance of at least two of the above-mentioned facilities. In this case, the broker system or aggregation server determines a value indicator using feedback data that is provided by prior users with demographic characteristics similar to those of the requestor. The requestor is likely to find the value indicator to be highly reliable, since it is based on subjective feedback data that is provided by prior users having tastes similar to those of the requestor.

In yet another approach, statistical usage data is used to determine a value indicator. Here, for a large population use of different process-dataset solutions is statistically determinative of a value indicator. For example, reuse of a process-dataset solution is weighted favorably such that a single use provides nominal value, many uses of a same process by a same party increases the measured value. Thus, a process that is reused by most users would have a much higher ranking than one that is rarely used a second time. Of course, this would poorly represent processes intended to be executed only once by any given user. That said, those processes would be ranked against each other and, as such, though the value indicators would be lower than for repeat use processes, they would remain comparable within a same geospatial service.

In still another approach, a third-party determines and assigns value indicators. For instance, the third-party is the aggregation server 114 in communication with the broker system 100. The third-party retrievably stores feedback data that is provided from a plurality of respondents, such that the feedback data provided by a specific respondent is associated uniquely therewith. Optionally, the feedback data relates to, in combination, a process and a dataset of a process-dataset solution, or the feedback data relates to only one of the process and the dataset of a process-dataset solution. Upon receiving a request from a current user that includes a particular process-dataset solution, the third-party determines a value indicator for the particular process-dataset solution based on the stored feedback data. In this approach, the value indicator optionally is based on the feedback data of an entire population of respondents, or is based on the feedback data of less than an entire population of respondents.

Optionally, value indicators are determined according to several of the above-mentioned approaches for being provided to the requestor in association with each process-dataset solution. The requestor bases their selection of a process-dataset solution on one or more of the value indicators as provided.

According to an embodiment of the instant invention, the value indicators associated with different process-dataset solutions, or the value indicators associated with components of different process-dataset solutions, are retrievably stored in storage device 104 of the broker system 100. The stored value indicators are optionally updated continuously, at predetermined intervals of time, or according to some other schedule. For instance, the requestor provides a request to the broker system 100 including search criteria for returning geospatial information to the requestor. The broker system 100 determines a plurality of process-dataset solutions, each process-dataset solution comprising a process and a dataset to be processed thereby so as to perform a geospatial information service for returning geospatial information to the requestor in accordance with the search criteria. The broker system 100 provides to the requestor a list including the plurality of process-dataset solutions and including a value indicator associated with each process-dataset solution. The requestor selects one of the process-dataset solutions based on the value indicator, and the geospatial information service is performed resulting in geospatial information being returned to the requestor in accordance with the search criteria. In particular, the selected process-dataset solution is provided to a geospatial information service provider, which provides for the implementation of the selected process-dataset solution and then provides a result of the process-dataset solution to the requestor. In the specific system that is shown in FIG. 1, the geospatial information service provider is included in the broker system 100. Optionally, the geospatial information service provider is a separate system that is in communication with the broker system and/or the requestor.

Optionally, the requestor provides user feedback data to the broker system 100, the user feedback data relating to the requestor's assessed value of the geospatial information. The broker system updates the value indicator associated with the selected process-dataset solution according to the updating rules that are in place, and then stores the updated value indicator in association with the selected process-dataset solution.

Advantageously, the value indicators are useful billing instruments. In particular, a billing system optionally is established in which the amount that is billed to a requestor for performing a geospatial information service is related to the value indicator associated with the corresponding process-dataset solution. Higher value indicators are indicative of better geospatial information, which enables better decision-making. Accordingly, the requester likely is willing to pay a premium amount for the performance of such a geospatial information service. Optionally, the billing system includes incentives that are designed to encourage a requestor to provide user feedback data for updating value indicators. In particular, the amount that is billed to a requester for performing a geospatial information service is discounted if the requester provides user feedback data, or the requestor is issued a coupon. Furthermore, other parties associated with performance of the geospatial information service may also be billed or receive credits in accordance with a predetermined scheme. For instance, any combination of advertising providers, process providers, dataset providers, users, geospatial service providers, broker systems or other participants may receive credits or be billed in relation to performance of a geospatial information service. Other participants include for instance providers of processing resources, upon which resources the process-dataset solutions are implemented.

Figure 2:
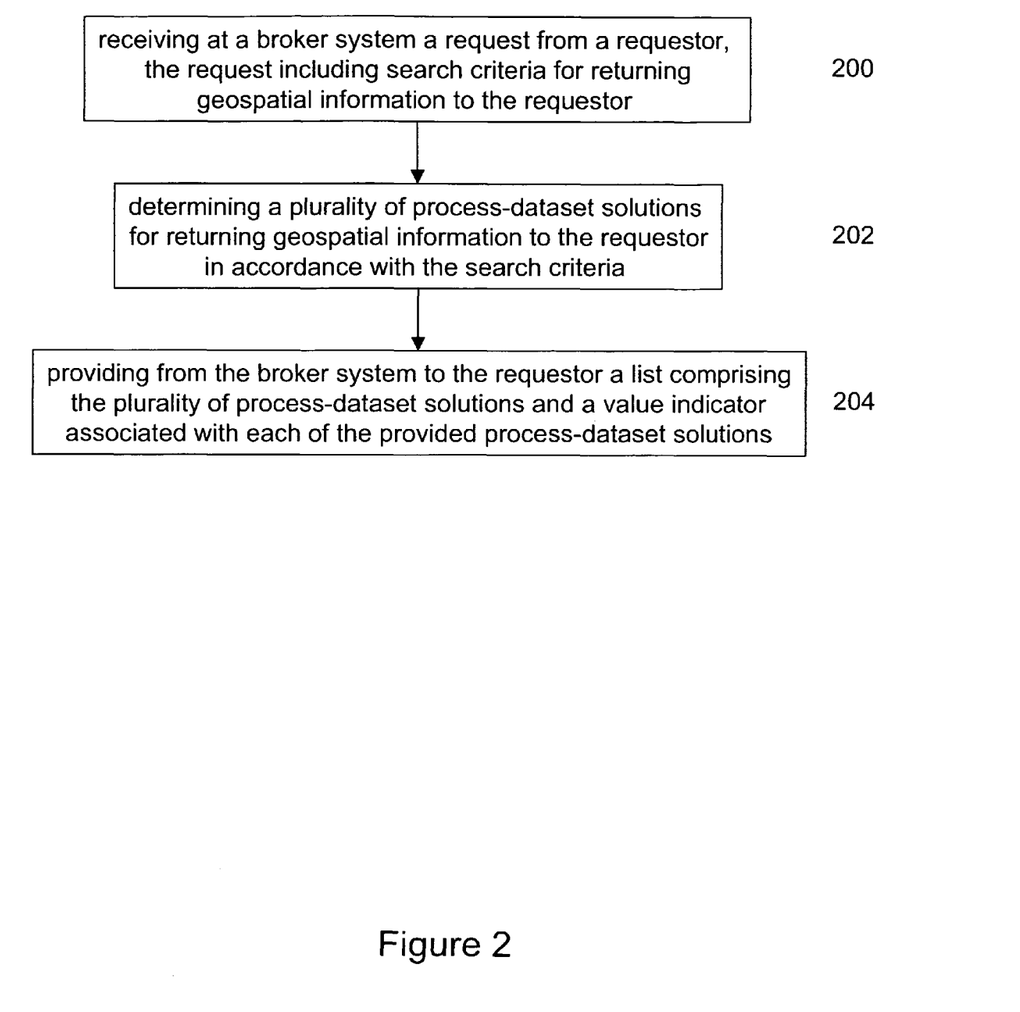
FIG. 2 is a simplified flow diagram of a method according to an embodiment of the instant invention for providing a geospatial information service in a broker-mediated geospatial information service environment.

Referring now to FIG. 2, shown is a simplified flow diagram of a method according to an embodiment of the instant invention for providing a geospatial information service in a broker-mediated geospatial information service environment. At 200 a broker system receives a request from a requestor, the request including search criteria for returning geospatial information to the requester. At 202 the broker system determines a plurality of process-dataset solutions. In particular, each of the determined process-dataset solutions comprises a process and a dataset to be processed thereby so as to perform a geospatial information service for returning geospatial information to the requestor in accordance with the search criteria. At 204 the broker system provides to the requester a list comprising the plurality of process-dataset solutions and a value indicator associated with each of the provided process-dataset solutions.

The requester then selects one process-dataset solution of the provided process-dataset solutions based on the value indication that is associated therewith, and provides a selection-response to the broker system. Upon receiving the selection-response at the broker system, a geospatial information service defined by the selected process-dataset solution is performed, and resulting geospatial information is provided to the requestor. The requester is billed an amount for performance of the geospatial information service. As discussed supra the amount billed optionally is based on the value indication of the selected process-dataset solution.

Alternatively, someone other than the requestor is billed, for example a service provider whose services are highlighted to the requestor. Optionally, both the requestor and the service provider are billed. Further optionally, the requestor is paid for the request.

Figure 3:
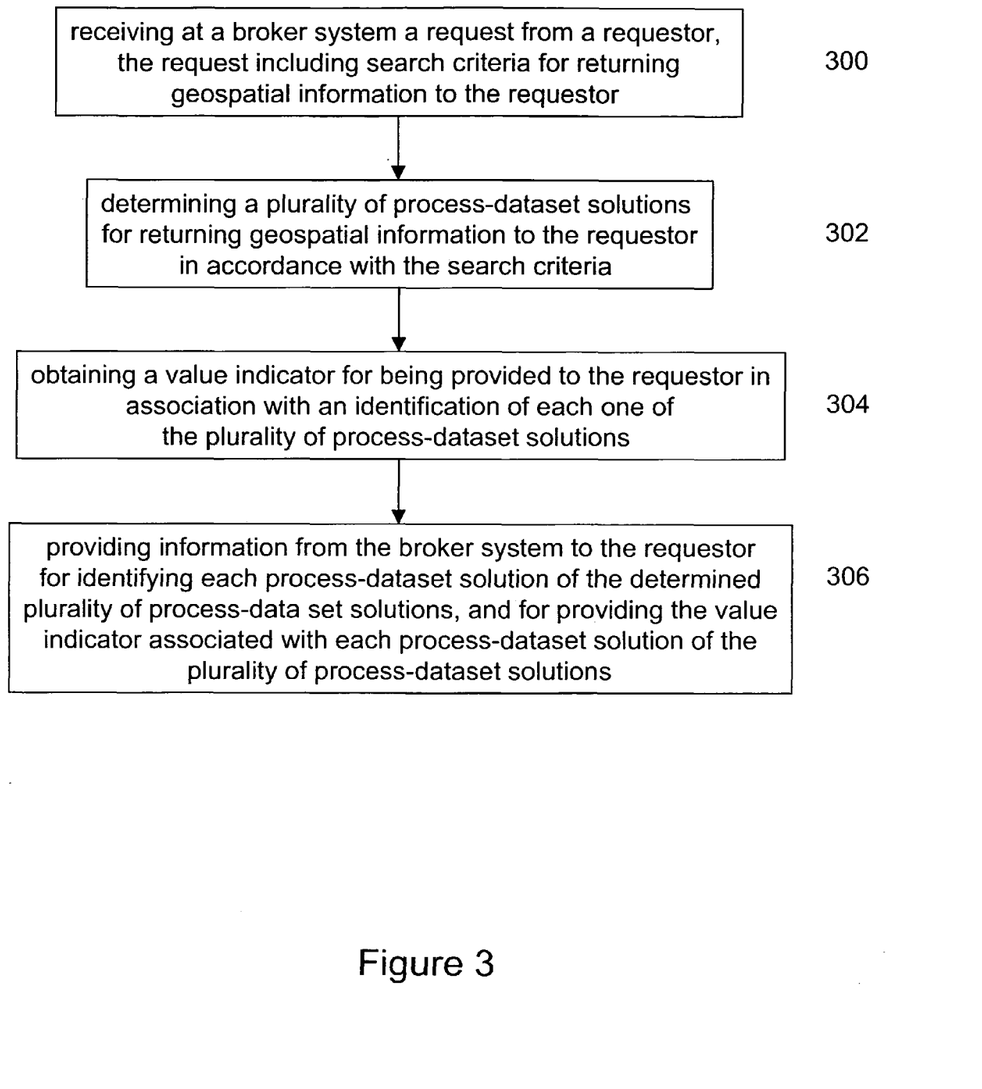
FIG. 3 is a simplified flow diagram of a method according to an embodiment of the instant invention for providing a geospatial information service in a broker-mediated geospatial information service environment.

Referring now to FIG. 3, shown is a simplified flow diagram of a method according to an embodiment of the instant invention for providing a geospatial information service in a broker-mediated geospatial information service environment. At 300 a broker system receives a request from a requester, the request including search criteria for returning geospatial information to the requester. At 302 the broker system determines a plurality of process-dataset solutions, each process-dataset solution comprising a process and a dataset to be processed thereby so as to perform a geospatial information service for returning geospatial information to the requester in accordance with the search criteria. At 304 the broker system obtains a value indicator for being provided to the requestor in association with an identification of each one of the plurality of process-dataset solutions. At 306, information is provided from the broker system to the requester for identifying each process-dataset solution of the determined plurality of process-data set solutions, and for providing the value indicator associated with each process-dataset solution of the plurality of process-dataset solutions.

Figure 4:
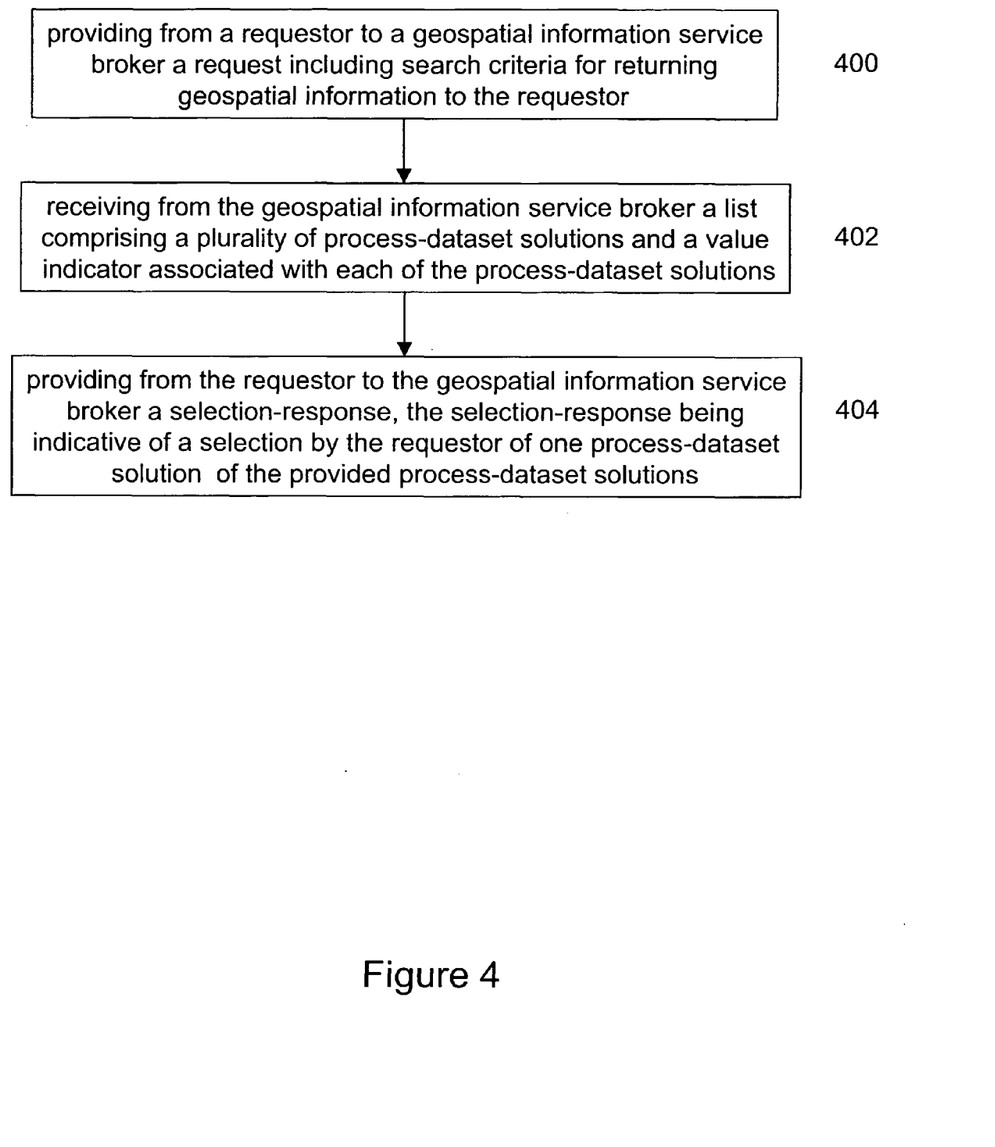
FIG. 4 is a simplified flow diagram of a method according to an embodiment of the instant invention for providing a geospatial information service in a broker-mediated geospatial information service environment; and, FIG. 5 is a simplified flow diagram of a method according to an embodiment of the instant invention for providing a geospatial information service in a broker-mediated geospatial information service environment.

Referring now to FIG. 4, shown is a simplified flow diagram of a method according to an embodiment of the instant invention for providing a geospatial information service in a broker-mediated geospatial information service environment. At 400 a request is provided from a requestor to a geospatial information service broker, the request including search criteria for returning geospatial information to the requestor. At 402 a list is received from the geospatial information service broker, the list comprising a plurality of process-dataset solutions and a value indicator associated with each of the provided process-dataset solutions. In particular, each process-dataset solution comprises a process and a dataset to be processed thereby so as to perform a geospatial information service for returning geospatial information to the requestor in accordance with the search criteria. At 404 a selection-response is provided from the requestor to the geospatial information service broker, the selection-response being indicative of a selection by the requestor of one process-dataset solution of the provided process-dataset solutions.

Figure 5:
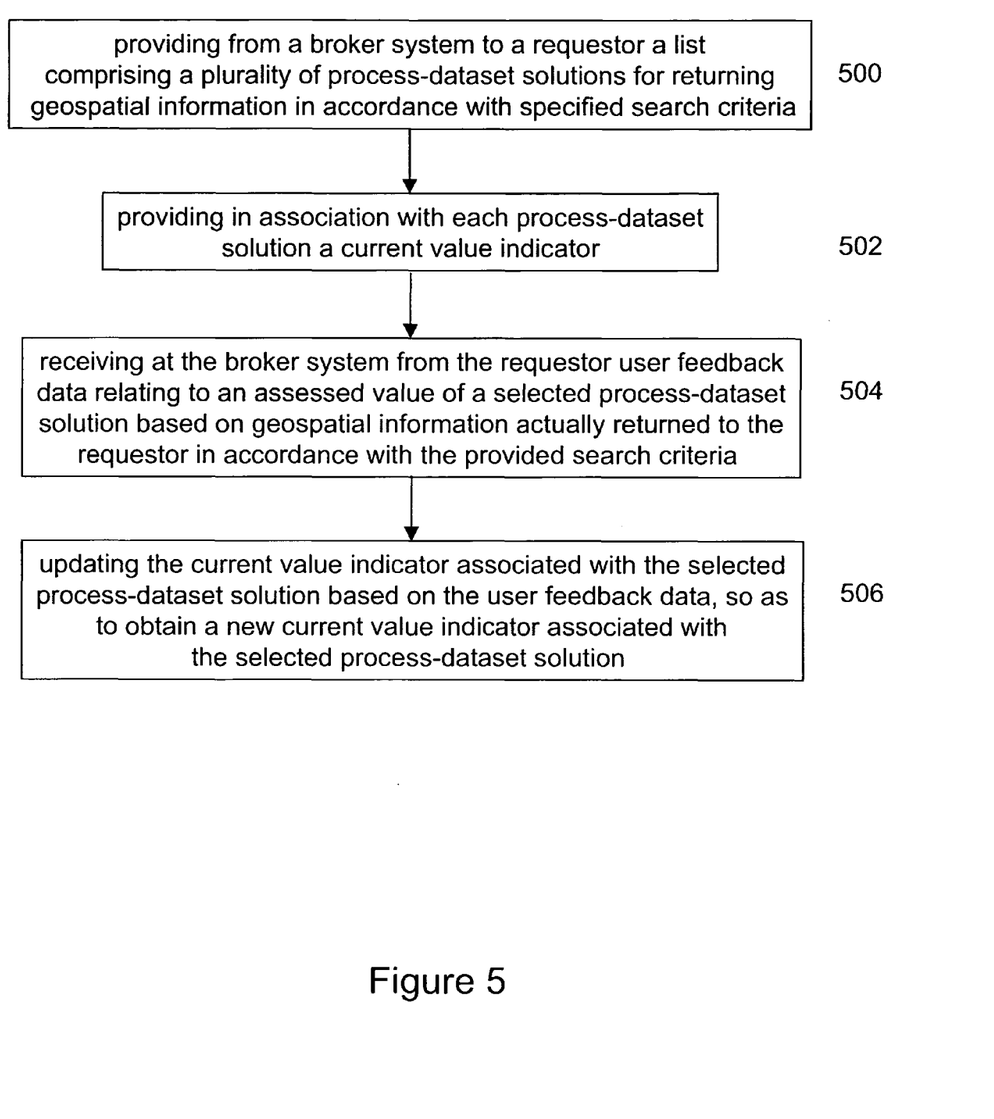

Referring now to FIG. 5, shown is a simplified flow diagram of a method according to an embodiment of the instant invention for providing a geospatial information service in a broker-mediated geospatial information service environment. At 500 a list is provided from a broker system to a requestor, the list comprising a plurality of process-dataset solutions, each process-dataset solution comprising a process and a dataset to be processed thereby so as to perform a geospatial information service for returning geospatial information to the requestor in accordance with search criteria provided by the requestor. At 502 a current value indicator is provided from the broker system to the requestor and in association with each process-dataset solution. At 504 the broker system receives from the requestor user feedback data relating to an assessed value of a selected process-dataset solution, based on geospatial information actually returned to the requestor in accordance with the provided search criteria. At 506 the broker system updates the current value indicator associated with the selected process-dataset solution, based on the user feedback data, so as to obtain a new current value indicator associated with the selected process-dataset solution.

In the above noted examples, the term process-dataset solution is used to indicate a solution comprising at least a process and at least a dataset. In some instances, a list of possible processes and a list of possible datasets are provided independently and a requestor selects from the list compatible processes and datasets. In such a case, processes and datasets have separate value indicators associated therewith. Alternatively, processes and datasets of dynamic value indicators such that selection of one of a process and a dataset results in an updating of value indicators for remaining options such that the updated value indicators correspond with a value of the selection when used with the already selected at least one of a process and dataset. In such a fashion, a user selects processes or datasets to use and is then presented with value data relating to compatibility in terms of a quality of a service when different components are selected. This overcomes the problem associated with technically compatible processes and datasets that when used together result in inferior services, which can happen even for well regarded processes and datasets.

Of course, the system of FIG. 1 is intended to be a non-limiting example of one specific system that is suitable for performing the methods according to the various embodiments of the instant invention. In the system of FIG. 1, the broker system, the aggregation server and process/dataset providers are shown as separate processing systems. Optionally, at least some of the various processing systems are combined. For instance, the broker system optionally includes the aggregation server and one or both of the process and dataset providers. Other suitable system configurations will be apparent to one of skill in the art.

Numerous other embodiments may be envisaged without departing from the spirit and scope of the invention.

What is claimed is:

1. A method for determining a value indicator in a broker-mediated geospatial information service environment, comprising:
    receiving from a second system via a communication network at a first system of the broker-mediated geospatial information service environment, from a plurality of respondents, feedback data relating to a broker-mediated geospatial information service based upon geospatial data including location and characteristic data relating to natural and constructed features and boundaries on the Earth and a geospatial information process for geospatially processing said dataset provided to each respondent of the plurality of respondents, each respondent of the plurality of respondents being a prior requestor of a process-dataset solution for performing the broker-mediated geospatial information service;
    based on the feedback data, determining a value indicator relating to the process-dataset solution based upon geospatial data including location and characteristic data relating to natural and constructed features and boundaries on the Earth and a geospatial information process for geospatially processing said dataset of the process-dataset solution; and
    transmitting via the communication network from the broker-mediated geospatial information service the value indicator in association with the process-dataset solution.

2. A method according to claim 1 wherein,
    the first system is a broker system of the broker-mediated geospatial information service environment.

3. A method according to claim 1 wherein,
    the first system is an aggregation server of the broker-mediated geospatial information service environment, the aggregation server for aggregating feedback data.

4. A method according to claim 1 comprising:
    receiving an indication of a first request from a current requestor, the indication comprising data indicative of the process-dataset solution; and,
    providing the determined value indicator associated with the process-dataset solution.

5. A method according to claim 1 wherein, the value indicator is a qualitative measure of the value of the process-dataset solution.

6. A method according to claim 1 wherein, the value indicator is a quantitative measure of the value of the process-dataset solution.

7. A method according to claim 1 wherein, the value indicator is a measure of the value of the process-dataset solution relative to the value of other process-dataset solutions.

8. A method according to claim 1 wherein, the value indicator is an absolute measure of the value of the process-dataset solution.

9. A method according to claim 1 wherein, the value indicator is based on the feedback data provided by all respondents of the plurality of respondents.

10. A method according to claim 9 wherein, the feedback data provided by some of the respondents of the plurality of respondents is weighted differently than the feedback data provided by other respondents of the plurality of respondents.

11. A method according to claim 9 wherein, the feedback data of those respondents that are determined to be repeat requestors of the process-dataset solution are weighted more heavily than the feedback data of those respondents that are determined to be one-time requestors of the process-dataset solution.

12. A method according to claim 9 wherein, the feedback data of those respondents that are determined to be repeat requestors of the process-dataset solution and the feedback data of respondents that are determined to be one-time requestors of the process-dataset solution are weighted approximately equally.

13. A method according to claim 4 wherein, the value indicator is based on the feedback data provided by all respondents of the plurality of respondents, and wherein the feedback data provided by some of the respondents of the plurality of respondents is weighted differently than the feedback data provided by other respondents of the plurality of respondents, and wherein the current requestor defines trusted respondents, and wherein the feedback data of the trusted respondents are weighted more heavily than the feedback data of other respondents.

14. A method according to claim 4 wherein, determining the value indicator is based on the feedback data provided by less than all respondents of the plurality of respondents.

15. A method according to claim 14 wherein, the current requestor defines trusted respondents, and wherein the value indicator is determined based on feedback data of the trusted respondents.

16. A method according to claim 14 comprising;
    identifying respondents that have demographic characteristics similar to those of the current requestor, and wherein the value indicator is based on feedback data of the identified respondents.

17. A method according to claim 16 wherein,
    identifying respondents that have demographic characteristics similar to those of the current requestor comprises comparing profile data of the current requestor to profile data of each respondent of the plurality of respondents.

18. A method according to claim 1 wherein, the value indicator relates to, in combination, a process and a dataset of the process-dataset solution.

19. A method according to claim 1 wherein, the value indicator relates to one of a process and a dataset of the process-dataset solution.

20. A method for determining a value indicator in a broker-mediated geospatial information service environment, comprising:
    retrievably storing feedback data from a plurality of respondents, the feedback data relating to a broker-mediated geospatial information service based upon geospatial data including location and characteristic data relating to natural and constructed features and boundaries on the Earth and a geospatial information process for geospatially processing said dataset of the process-dataset solution provided previously to each respondent of the plurality of respondents, the feedback data being stored in a manner such that the feedback data provided by a specific respondent is associated uniquely therewith, each respondent of the plurality of respondents being a prior requestor of a particular process-dataset solution for performing the broker-mediated geospatial information service;

receiving via a communication network an indication of a first request from a current requestor, the indication having the particular process-dataset solution; and, based on stored feedback data that is uniquely associated with at least some of the respondents of the plurality of respondents, determining a value indicator that is a qualitative measure relating the particular process-dataset solution, the value indicator determined by weighting feedback data provided by some of the respondents of the plurality of respondents differently than the feedback data provided by other respondents of the plurality of respondents.

21. A method according to claim 20 wherein, the value indicator is a measure of the value of the particular process-dataset solution relative to the value of other process-dataset solutions.

22. A method according to claim 20 wherein, the feedback data of those respondents that are determined to be repeat requestors of the particular process-dataset solution are weighted more heavily than the feedback data of those respondents that are determined to be one-time requestors of the particular process-dataset solution.

23. A method according to claim 20 wherein the current requestor defines trusted respondents, and wherein the feedback data of the trusted respondents are weighted more heavily than the feedback data of other respondents.

24. A method according to claim 20 wherein,
determining a value indicator relating to the particular process-dataset solution comprises obtaining from other than the current requestor a defined trusted respondent group, and
wherein the feedback data provided by respondents of the defined trusted respondent group are weighted more heavily than the feedback data provided by other respondents of the plurality of respondents.

25. A method according to claim 20 wherein,
determining the value indicator is based on the feedback data provided by less than all respondents of the plurality of respondents.

26. A method according to claim 20 wherein,
the current requestor defines trusted respondents, and wherein the value indicator is determined disproportionately based on feedback data of the trusted respondents.

27. A method according to claim 20 comprising;
identifying respondents that have demographic characteristics similar to those of the current requestor, and wherein the value indicator is based disproportionately on feedback data of the identified respondents.

* * * * *